(12) United States Patent
Shen et al.

(10) Patent No.: US 12,407,616 B2
(45) Date of Patent: Sep. 2, 2025

(54) POLICY INSTANCE REUSE IN CONTROL PLANES OF NETWORKS

(71) Applicant: Cisco Technology, Inc., San Jose, CA (US)

(72) Inventors: Changhong Shen, Shanghai (CN); Chunxu Zhou, Shanghai (CN); FeiXiang Zhao, Shanghai (CN); Pu Duan, Shanghai (CN); Yin Wang, Shanghai (CN); Hongbo Xia, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 4 days.

(21) Appl. No.: 18/589,903

(22) Filed: Feb. 28, 2024

(65) Prior Publication Data

US 2025/0202825 A1 Jun. 19, 2025

Related U.S. Application Data

(60) Provisional application No. 63/610,256, filed on Dec. 14, 2023.

(51) Int. Cl.
*H04L 12/14* (2024.01)
*H04L 47/20* (2022.01)
*H04L 47/2491* (2022.01)
*H04W 76/38* (2018.01)

(52) U.S. Cl.
CPC .......... *H04L 47/20* (2013.01); *H04L 47/2491* (2013.01)

(58) Field of Classification Search
None
See application file for complete search history.

(56) References Cited

U.S. PATENT DOCUMENTS

| 6,718,380 B1* | 4/2004 | Mohaban | H04L 47/724 709/224 |
| 2018/0191786 A1* | 7/2018 | Kunz | H04W 8/12 |
| 2019/0174573 A1* | 6/2019 | Velev | H04W 80/10 |
| 2020/0145876 A1* | 5/2020 | Dao | H04L 12/1407 |

FOREIGN PATENT DOCUMENTS

WO WO2019001381 A1 1/2019

OTHER PUBLICATIONS

Riverbed, "Configuring Hybrid Networking, QOS, and Path Selection," downloaded Jan. 4, 2024, 58 pages.
Cisco, "Forwarding and Qos," Cisco Catalyst SD-WAN Forwarding and QoS Configuration Guide, Cisco IOS XE Catalyst SD-WAN Release 17.X, published Dec. 18, 2023, 12 pages.
Pham Tran Anh Quang, et al., "Routing and QoS Policy Optimization in SD-WAN," Arxiv, published Sep. 27, 2022, 3 pages.

* cited by examiner

Primary Examiner — Natisha D Cox
(74) Attorney, Agent, or Firm — Lee & Hayes, P.C.

(57) ABSTRACT

Techniques and architecture are described for reusing QoS policy instances for groups of software defined wide area network (SDWAN)-based transport locators (TLOCs) sharing the same attributes. For example, the attributes may include subscriber transport bandwidth (e.g., a transport bandwidth based on a user profile), QoS policy template profile information, transport locator color, etc. All of this information may be shared across the SDWAN fabric and may be available in the overlay management protocol (OMP) TLOC database.

20 Claims, 5 Drawing Sheets

POLICY INSTANCE REUSE IN CONTROL PLANES OF NETWORKS

PRIORITY CLAIM AND CROSS-REFERENCE TO RELATED APPLICATIONS

This application is a non-provisional of, and claims priority under 35 USC § 119(e), to U.S. Provisional Patent Application No. 63/610,256, filed Dec. 14, 2023, which is fully incorporated by reference herein as if fully set forth below.

TECHNICAL FIELD

The present disclosure relates generally to methods of policy instance reuse in control planes of networks, and more particularly, to methods of quality of service (QoS) policy instance reuse in control planes of software-defined wide area networks (SDWANs).

BACKGROUND

SDWANs are generally highly scalable. In some configurations, SDWANs support up to 10,000 site-to-site tunnels for one single overlay fabric. However, per tunnel/session QoS policy insertion may be a bottleneck in some configurations. Additionally, in some configurations, maximum supported per-tunnel QoS policy may only be 2000 policy instances, both for dynamic multipoint virtual private network (DMVPN)-based and SDWAN controller-based overlay networks.

In some configurations, a control plane may comprise two portions. For example, a first portion may be in the form of a forwarding table manager (FTM) control plane and a second portion may be in the form of an internetworking operating system (IOS) control plane. During tunnel set-up/tear down, overall convergence time gets much worse with higher scale and under extreme conditions, the system gets into a loop state and cannot become converged at all resulting in repeated FTM control plane (transport side) flapping. Thus, the IOS control plane is too slow to process different FTM requests for creating tunnels during QoS policy installation by the IOS control plane during tunnel creation. The tunnel creation is done sequentially for each session, which results in extremely long tunnel creation sessions. Under worse case scenarios, the FTM and IOS databases are out of sync, resulting in invalid bidirectional forwarding detection (BFD) sessions, and high CPU utilization for policy installation/withdraw thereby making matters worse.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

The present disclosure provides techniques and architecture for policy instance reuse in control planes of networks, and more particular to methods of quality of service (QoS) policy instance reuse in control planes of software-defined wide area networks (SDWANs). While the present disclosure describes the techniques and architecture primarily with respect to SDWAN controller-based overlay networks, the techniques and architecture may be equally applicable to other types of networks, for example, dynamic multipoint virtual private network (DMVPN)-based networks. More particularly, the techniques and architecture provide for reusing QoS policy instances for groups of SDWAN transport locators (TLOCs) sharing the same attributes. For example, the attributes may include subscriber transport bandwidth (e.g., a transport bandwidth based on a user profile), QoS policy template profile information, transport locator color, etc. All of this information may be shared across the SDWAN fabric and is generally available in the overlay management protocol (OMP) TLOC database. Most network subscribers, e.g., users, share similar branch profiles with the similar transport bandwidth capacity and subscription of QoS policy templates.

As an example, a method may include evaluating a user profile of a user of a wide area network (WAN) and based at least in part on the evaluating, determining tunnels within the WAN having one or more common attributes. The method may also include, based at least in part on the one or more common attributes, grouping the tunnels into groups and for each particular group, installing, by a controller of a control plane of the WAN, a corresponding quality of service (QoS) policy instance on each tunnel of the particular group.

Example Embodiments

In accordance with configurations described herein, as previously noted, techniques and architecture are described herein for policy instance reuse in control planes of networks, and more particularly to methods of quality of service (QoS) policy instance reuse in control planes of software-defined wide area networks (SDWANs). While the present disclosure describes the techniques and architecture primarily with respect to SDWAN controller-based overlay networks, the techniques and architecture may be equally applicable to other types of networks, for example, dynamic multipoint virtual private network (DMVPN)-based networks. More particularly, the techniques and architecture provide for reusing QoS policy instances for groups of SDWAN transport locators (TLOCs) sharing the same attributes. For example, the attributes may include subscriber transport bandwidth (e.g., a transport bandwidth based on a user profile), QoS policy template profile information, transport locator color, etc. All of this information may be shared across the SDWAN fabric and is generally available in the overlay management protocol (OMP) TLOC database. Most network subscribers, e.g., users, share similar branch profiles with the similar transport bandwidth capacity and subscription of QoS policy templates.

As is known, in configurations, networks may be used to transmit packets of information between source points and end points. For example, in SDWAN-based networks, virtual edge routers may receive packets from various sources. These packets are then routed to end point sites. Tunnels may be created between the edge routers and the endpoint sites. A control plane of the network may utilize a tunnel session to create the tunnels connecting the edge routers and the end point sites. The tunnels may be created during a tunnel session handled by a control plane of the SDWAN-based networks.

In configurations, the control plane may be divided into two portions. A first portion may be in the form of a forwarding table manage (FTM) control plane and a second portion may be in the form of an internet working operating system (IOS) control plane. The FTM control plane may send a create tunnel session to the IOS control plane. A tunnel session may then be created without a flow identifier (ID). The FTM control plane may issue a create command to an IPSEC shim. The IPSec shim may forward a create command to the IOS control plane for creating the IPSEC of the tunnels. A flow ID may be created for the session (SA). The FTM control plane may issue a delete session command to the IOS control plane for deleting the tunnel session. The FTM control plane may also issue a delete command to the FTM IPSec shim portion of the FTM control plane. The flow ID may be created for the session and added to the tunnel session. The IOS control plane adds the SA to the IOS tunnel session and a quality of service (QoS) policy and dummy session are created. The IPSec shim of the FTM control plane issues a delete command to the IPSec portion of the IOS control plane. Thus, the flow ID delete is not forwarded to the tunnel session of the IOS control plane.

Thus, during tunnel set-up/tear down, overall convergence time gets much worse with higher scale and under extreme conditions, the system gets into a loop state and cannot become converged at all, resulting in repeated FTM control plane (transport side) flapping. Thus, the IOS control plane is too slow to process different FTM requests for creating tunnels during QoS policy installation by the IOS control plane during tunnel creation. The tunnel creation is done sequentially for each session, which results in extremely long tunnel creation sessions. Under worse case scenarios, the FTM and IOS databases are out of sync, resulting in invalid bidirectional forwarding detection (BFD) sessions, and high CPU utilization for policy installation/withdraw thereby making matters worse.

Therefore, to address this scenario, QoS policy instances for groups of SDWAN TLOCs sharing the same attributes are reused and tunnels may be created in parallel. For example, the attributes may include subscriber transport bandwidth (e.g., a transport bandwidth based on a user profile), QoS policy template profile information, transport locator color, etc. All of this information may be shared across the SDWAN fabric and is available in the OMP TLOC database. Most network subscribers, e.g., users, share similar branch profiles with the similar transport bandwidth capacity and subscription of QoS policy templates. Thus, user profiles may be evaluated to determine common attributes for tunnels. Based on the common attributes, tunnels may be grouped into groups and corresponding instances of QoS policies may be created for each group. The corresponding QoS policy instance may be installed on each tunnel of a group.

In configurations, the SDWAN QoS policy installation procedure and processing overhead may be improved by removing redundant policy-map notification with three-level hierarchical queuing policies. Thus, the techniques and architecture described herein provide subscriber multi-dimensional stability for SDWAN tunnel scale with per channel QoS policies enabled.

Thus, the QoS policy-map instance reuse for same groups of tunnels (spokes) may be used during a tunnel session of the FTM control plane and the IOS control plane. For example, with a 2000 per tunnel QoS policy and ten percent of policy reuse for the same subscriber profile, the IOS control plane only needs to create/update/delete 200 SDWAN policy-map instances. This saves more than 70 percent of overall IOS processing time regarding recursive processing overhead for policy installation and avoids the flapping by the FTM control plane. With QoS policy instance reuse, a very high scale improvement may be achieved, improving convergence with high scale of tunnels. Additionally, group-based QoS policy and policy instance sharing for the same group of tunnels (spokes)/TLOCs/users (subscribers) at the data-plane, reduce the required number of QoS polices and queuing resources when tunnel scale increases.

Accordingly, in configurations, a method includes evaluating a user profile of a user of a wide area network (WAN) and based at least in part on the evaluating, determining tunnels within the WAN having one or more common attributes. The method also includes, based at least in part on the one or more common attributes, grouping the tunnels into groups and for each particular group, installing, by a controller of a control plane of the WAN, a corresponding quality of service (QoS) policy instance on each tunnel of the particular group.

In some configurations, the one or more common attributes comprises at least a QoS policy template.

In further configurations, the one or more common attributes comprises at least a transport bandwidth based on the user profile.

In additional configurations, the one or more common attributes comprises at least a transport locator (TLOC) color.

In some configurations, the one or more common attributes comprise two or more common attributes.

In further configurations, the two or more common attributes comprises at least a QoS policy template.

In additional configurations, the two or more common attributes comprises at least a transport bandwidth based on the user profile.

In some configurations, the two or more common attributes comprises at least a transport locator (TLOC) color.

In additional configurations, the method further comprises, for each particular group, sharing, by the controller of the control plane of the WAN with a controller of a data plane of the WAN, the corresponding QoS policy instance for each tunnel of the particular group.

Thus, the techniques and architecture provide for reusing QoS policy instances for groups of SDWAN transport locators (TLOCs) sharing the same attributes. For example, the attributes may include subscriber transport bandwidth (e.g., a transport bandwidth based on a user profile), QoS policy template profile information, transport locator color, etc. All of this information may be shared across the SDWAN fabric and is generally available in the overlay management protocol (OMP) TLOC database. Most network subscribers, e.g., users, share similar branch profiles with the similar transport bandwidth capacity and subscription of QoS policy templates. The techniques and architecture thus save overall IOS processing time regarding recursive processing overhead for policy installation and avoids the flapping by the FTM control plane. With QoS policy instance reuse, a very high scale improvement may be achieved, improving convergence with high scale of tunnels. Additionally, group-based QoS policy and policy instance sharing for the same group of tunnels (spokes)/TLOCs/users (subscribers) at the data-plane, reduce the required number of QoS polices and queuing resources when tunnel scale increases.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1:
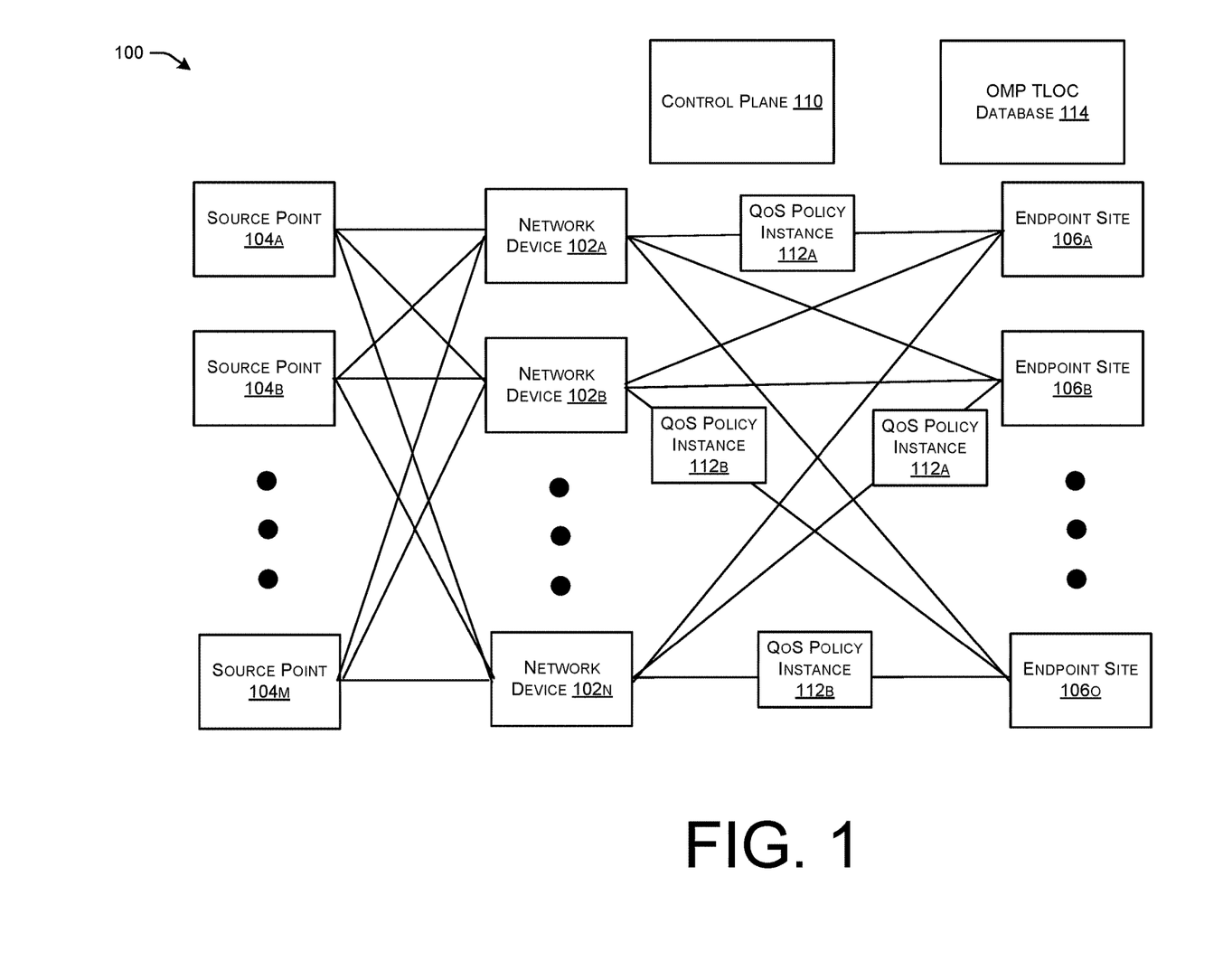
FIG. 1 schematically illustrates an example of a network arrangement that reuses quality of service (QoS) policy instances during tunnel creation, in accordance with techniques and architecture described herein.

FIG. 1 schematically illustrates an example of a network 100 that includes multiple network devices 102a-102n. Each network device may be configured in one or more ways for Internet Protocol (IP) security (IPsec). In configurations, the network 100 is configured as software-defined wide area network (SDWAN) and the network devices 102 are configured as virtual edge routers. As is known, the network devices 102 route packets from source points 104 to endpoint sites 106.

More particularly, in the example of FIG. 1, as is known, in configurations, the network 100 may be used to transmit packets of information between source points 104a-104m and endpoint sites 106a-106p. For example, in SDWAN-based networks, the network devices 102 in the form of virtual edge routers may receive packets from various sources, e.g., source points 104. These packets are then routed to endpoint sites 106 by the network devices 102. Tunnels 108 may be created between the network devices 102 and the endpoint sites 106 for transmitting the packets. A control plane 110 of the network 100 may utilize a tunnel session to create the tunnels 108 connecting the network devices 102 and the endpoint sites 106.

The tunnels 108 may be created during a tunnel session handled by the control plane 110 of the SDWAN-based network 100, as described further herein. During a tunnel creation session, the control plane reuses QoS policy instances 112, e.g., 112a and 112b, on tunnels 108 for groups of SDWAN transport locators (TLOCs) sharing the same attributes. For example, the attributes may include subscriber transport bandwidth (e.g., a transport bandwidth based on a user profile), QoS policy template profile information, transport locator color, etc. All of this information may be shared across the SDWAN fabric and is generally available in an overlay management protocol (OMP) TLOC database 114. Most network subscribers, e.g., users, share similar branch profiles with the similar transport bandwidth capacity and subscription of QoS policy templates. Thus, user profiles may be evaluated to determine common attributes for tunnels. Based on the common attributes, tunnels may be grouped into groups and corresponding instances of QoS policies may be created for each group. The corresponding QoS policy instance may be installed on each tunnel of a group.

Figure 2A:
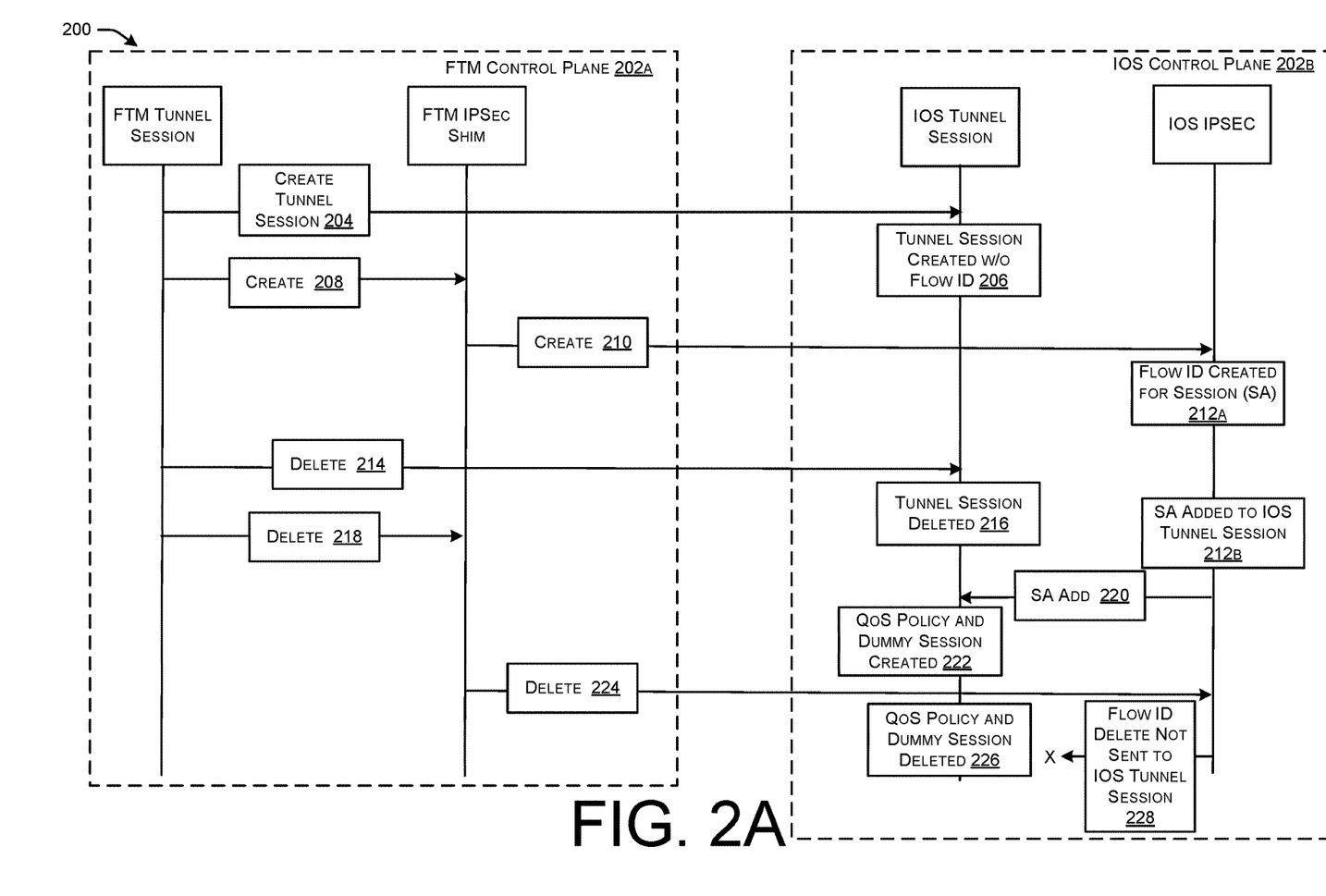
FIGS. 2A and 2B schematically illustrate example workflows for a tunnel set-up (creation)/tear down session that reuses quality of service (QoS) policy instances during tunnel creation, in accordance with techniques and architecture described herein.
Figure 2B:
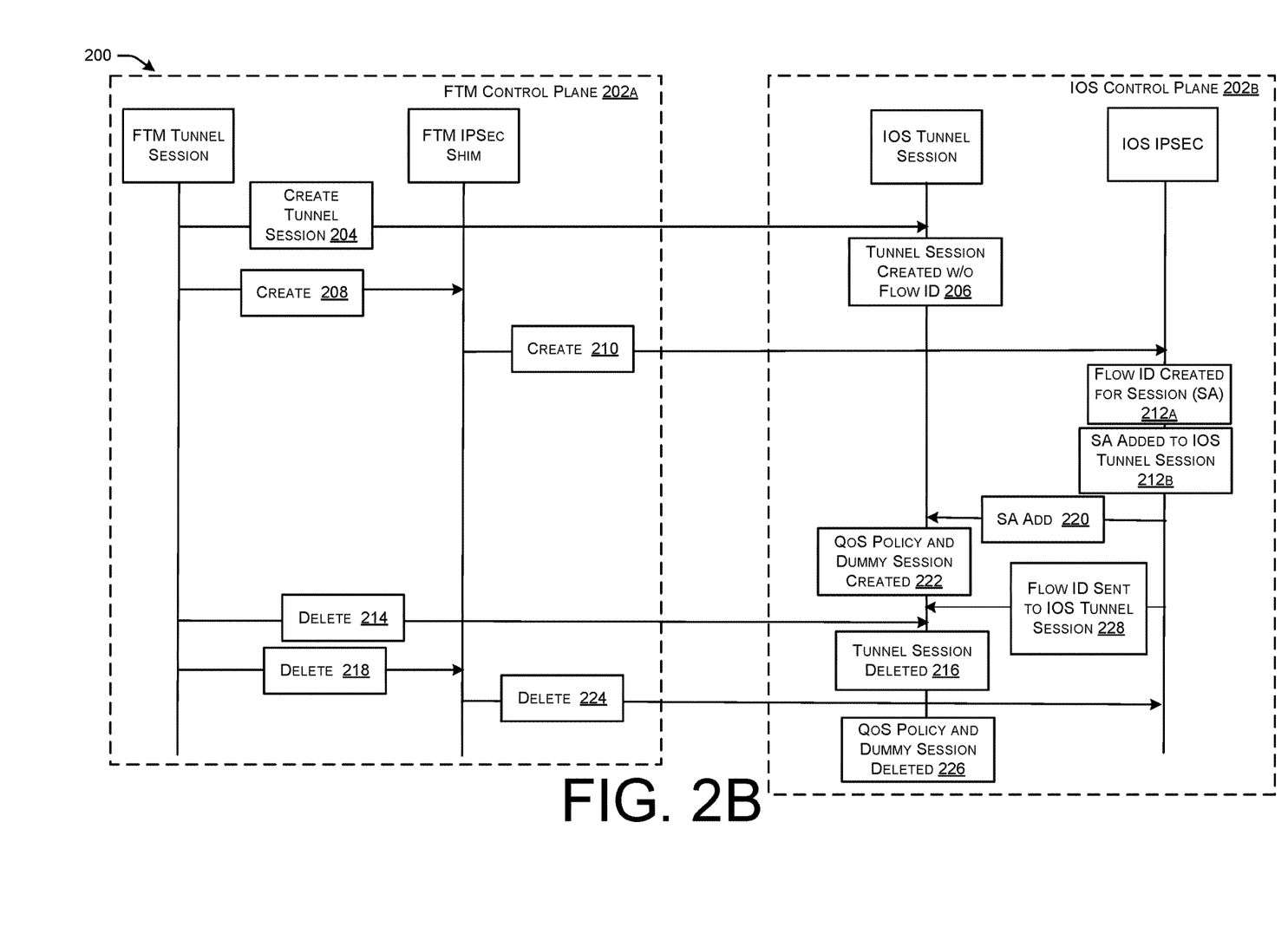

FIGS. 2A and 2B schematically illustrate example workflows for a tunnel set-up (creation)/tear down session 200.

As can be seen in FIGS. 2A and 2B, in configurations, the control plane 110 may be divided into two portions. A first portion may be in the form of a forwarding table manage (FTM) control plane 202a and a second portion may be in the form of an internet working operating system (IOS) control plane 202b. At 204, the FTM control plane 202a tunnel session may send a create tunnel session to the IOS control plane 202b tunnel session. At 206, a tunnel session may then be created without a flow identifier (ID). At 208, the FTM control plane 202a tunnel session may issue a create command to an FTM control plane 202a IPSEC shim. At 210, the FTM control plane 202a IPSEC shim may forward a create command to an IOS control plane 202b IPSec for creating the IPSec of the tunnels. At 212a, 212b, a flow ID may be created for the session (secure access (SA)) and the SA is added to the tunnel session.

At 214, the FTM control plane 202a tunnel session may issue a delete session command to the IOS control plane 202b tunnel session for deleting the tunnel session and the tunnel session is deleted at 216. At 218, the FTM control plane 202a tunnel session may also issue a delete command to the FTM control plane 202a IPSEC shim portion. At 220, the IOS control plane 202b tunnel session adds the SA to the IOS tunnel session and at 222, a quality of service (QoS) policy and dummy session are created. At 224, the control plane 202a IPSec shim issues a delete command to the IOS control plane 202b IPSec portion and at 226, the QoS policy and dummy session is deleted. Thus, the flow ID delete 228 is not forwarded to the IOS control plane 202b tunnel session prior to step 226 if each tunnel has a QoS policy instance created and added individually.

Thus, during tunnel set-up/tear down 200, overall convergence time gets much worse with higher scale and under extreme conditions, the system gets into a loop state and cannot become converged at all, resulting in repeated FTM control plane 202a (transport side) flapping. Thus, the IOS control plane 202b is too slow to process different FTM requests for creating tunnels during QoS policy installation by the IOS control plane during tunnel creation. The tunnel creation is done sequentially for each session, which results in extremely long tunnel creation sessions. Under worse case scenarios, the FTM and IOS databases are out of sync, resulting in invalid bidirectional forwarding detection (BFD) sessions, and high CPU utilization for policy installation/withdraw thereby making matters worse.

Therefore, to address this scenario, QoS policy instances for groups of SDWAN TLOCs sharing the same attributes are reused and tunnels may be created in parallel using the QoS policy instances. For example, the attributes may include subscriber transport bandwidth (e.g., a transport bandwidth based on a user profile), QoS policy template profile information, transport locator color, etc. All of this information may be shared across the SDWAN fabric and is available in the OMP TLOC database. Most network subscribers, e.g., users, share similar branch profiles with the similar transport bandwidth capacity and subscription of QoS policy templates. Thus, referring to FIG. 2B, steps 212a, 212b, 220, and 222 may be performed before steps 214, 216, 218, 224, and 226 if the QoS policy instances for groups of SDWAN TLOCs sharing the same attributes are reused and tunnels are created in parallel. Additionally, the flow ID delete 228 is forwarded to the IOS control plane 202b tunnel session prior to step 226 if each tunnel having common attributes as described herein reuses a QoS policy instance that is added in parallel.

For example, as can be seen below in Table 1, it can be seen that each dedicated SDWAN QoS Policy can be reused by multiple SDWAN tunnels/sessions. For example, SDWANPolicy4437623 is reused by 10 spokes sharing the same downstream bandwidth (40) and the same QoS policy template SDWANPolicy4437623. Likewise, SDWAN-Policy4437632 is reused by 10 spokes sharing the same downstream bandwidth (20) and the same QoS policy template SDWANPolicy4437632. Thus, a controller of the control plane may group tunnels based on common attributes and create corresponding instances of QoS policies to be installed on the tunnels of a group.

============Session QoS Policy Database============

| policy | bandwidth | remaining-ratio | template | sessions |
|---|---|---|---|---|
| SDWANPolicy4437623 | 407304000 | 40 | qos_policy_4class | 10 |
| SDWANPolicy4437632 | 204402000 | 20 | qos_policy_4class | 10 |
| SDWANPolicy4437639 | 303302000 | 30 | qos_policy_4class | 10 |
| SDWANPolicy4437657 | 205302000 | 20 | qos_policy_4class | 10 |
| SDWANPolicy4437658 | 205402000 | 20 | qos_policy_4class | 10 |
| SDWANPolicy4437663 | 406204000 | 40 | qos_policy_4class | 10 |
| SDWANPolicy4437666 | 409304000 | 40 | qos_policy_4class | 10 |
| SDWANPolicy4437676 | 404104000 | 40 | qos_policy_4class | 10 |
| SDWANPolicy4437679 | 205002000 | 20 | qos_policy_4class | 10 |
| SDWANPolicy4437683 | 106100000 | 10 | qos_policy_4class | 10 |
| SDWANPolicy4437685 | 205102000 | 20 | qos_policy_4class | 10 |
| SDWANPolicy4437786 | 108200000 | 10 | qos_policy_4class | 10 |
| SDWANPolicy4437807 | 404004000 | 40 | qos_policy_4class | 10 |
| SDWANPolicy4437814 | 407104000 | 40 | qos_policy_4class | 10 |
| SDWANPolicy4437885 | 201402000 | 20 | qos_policy_4class | 10 |
| SDWANPolicy4438055 | 408404000 | 40 | qos_policy_4class | 10 |
| SDWANPolicy4438147 | 304102000 | 30 | qos_policy_4class | 10 |
| SDWANPolicy4438157 | 405204000 | 40 | qos_policy_4class | 10 |

Table 1

In configurations, the SDWAN QoS policy installation procedure and processing overhead may be improved by removing redundant policy-map notification with three-level hierarchical queuing policies. Thus, the techniques and architecture described herein provide subscriber multi-dimensional stability for SDWAN tunnel scale with per channel QoS policies enabled. For example, for 10,000 tunnels 108, multi-dimensional scale 10,000 tunnels with per-tunnel QoS polices enabled on network devices 102, e.g., virtual edge routers, flapping may be reliably avoided with fast and reliable control-plane convergence time.

Additionally, by reusing the same QoS policy instance for the same group of spoke/TLOCs subscribing the QoS policy and bandwidth profile, more loss of QoS bandwidth management granularity may be realized since the same set of TLOCs or spokes share the same shaper bandwidth and data-plane queueing resources. Overall, the system policy instance requirements are lower than over all tunnel scale for the same head-end device. For example, when head-end supports 20,000 tunnels, a user (network subscriber) can still stick to 10,000 policy instances and every two of tunnels (spokes) share the same QoS policy instance. Thus, the QoS policy-map instance reuse for same groups of tunnels (spokes) may be used during a tunnel session of the FTM control plane 202a and the IOS control plane 202b.

For example, with a 2000 per tunnel QoS policy and ten percent of policy reuse for the same subscriber profile, the IOS control plane 202b only needs to create/update/delete 200 SDWAN policy-map instances. This saves more than 70 percent of overall IOS processing time regarding recursive processing overhead for policy installation and avoids the flapping by the FTM control plane 202a. With QoS policy instance reuse, a very high scale improvement may be achieved, improving convergence with high scale of tunnels. Additionally, group-based QoS policy and policy instance sharing for the same group of tunnels (spokes)/TLOCs/users (subscribers) at the data-plane, reduce the required number of QoS polices and queuing resources when tunnel scale increases.

Thus, the techniques and architecture provide for reusing QoS policy instances for groups of SDWAN transport locators (TLOCs) sharing the same attributes. For example, the attributes may include subscriber transport bandwidth (e.g., a transport bandwidth based on a user profile), QoS policy template profile information, transport locator color, etc. All of this information may be shared across the SDWAN fabric and is generally available in the overlay management protocol (OMP) TLOC database. Most network subscribers, e.g., users, share similar branch profiles with the similar transport bandwidth capacity and subscription of QoS policy templates. The techniques and architecture thus save overall IOS processing time regarding recursive processing overhead for policy installation and avoids the flapping by the FTM control plane. With QoS policy instance reuse, a very high scale improvement may be achieved, improving convergence with high scale of tunnels. Additionally, group-based QoS policy and policy instance sharing for the same group of tunnels (spokes)/TLOCs/users (subscribers) at the data-plane, reduce the required number of QoS polices and queuing resources when tunnel scale increases.

Figure 3:
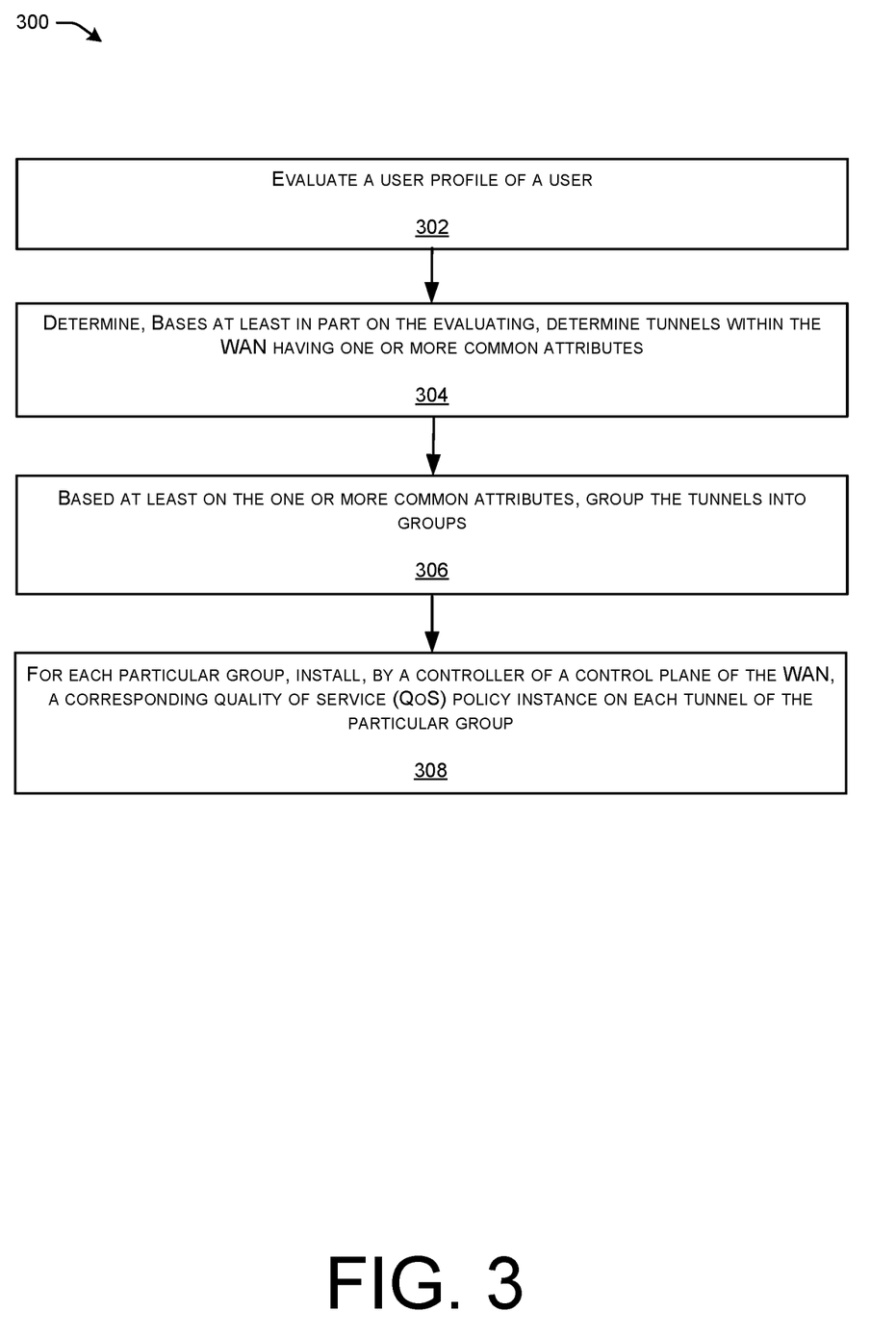
FIG. 3 illustrates a flow diagram of an example method for reusing quality of service (QoS) policy instances during tunnel creation, in accordance with the techniques and architecture described herein.

FIG. 3 illustrates a flow diagram of an example method 300 and illustrates aspects of the functions performed at least partly by devices of a network as described with respect to FIGS. 1, 2A, and 2B. The logical operations described herein with respect to FIG. 3 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 3 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 3 illustrates a flow diagram of an example method 300 for reusing quality of service (QoS) policy instances during tunnel creation. In some examples, the method 300 may be performed by a system comprising one or more processors and one or more non-transitory computer-readable media storing computer-executable instructions that, when executed by the one or more processors, cause the one or more processors to perform the method 300.

At 302, a user profile of a user of a wide area network (WAN) is evaluated. At 304, based at least in part on the evaluating, tunnels are determined within the WAN having one or more common attributes. For example, the tunnels 108 may be created during a tunnel session handled by the control plane 110 of the SDWAN-based network 100, as described further herein. During a tunnel creation session, the control plane reuses QoS policy instances 112, e.g., 112a and 112b, for groups of tunnels of SDWAN transport locators (TLOCs) sharing the same attributes. For example, the attributes may include subscriber transport bandwidth (e.g., a transport bandwidth based on a user profile), QoS policy template profile information, transport locator color, etc. All of this information may be shared across the SDWAN fabric and is generally available in an overlay management protocol (OMP) TLOC database 114. Most network subscribers, e.g., users, share similar branch profiles with the similar transport bandwidth capacity and subscription of QoS policy templates. Thus, user profiles may be evaluated to determine common attributes for tunnels. Based on the common attributes, tunnels may be grouped into groups and corresponding instances of QoS policies may be created for each group. The corresponding QoS policy instance may be installed on each tunnel of a group.

At 306, based at least in part on the one or more common attributes, the tunnels are grouped into groups. At 308 for each particular group, a controller of a control plane of the WAN installs a corresponding quality of service (QoS) policy instance on each tunnel of the particular group. For example, as can be seen in Table 1, it can be seen that each dedicated SDWAN QoS Policy can be reused by multiple SDWAN tunnels/sessions. For example, SDWAN-Policy4437623 is reused by 10 spokes sharing the same downstream bandwidth (40) and the same QoS policy template SDWANPolicy4437623. Likewise, SDWAN-Policy4437632 is reused by 10 spokes sharing the same downstream bandwidth (20) and the same QoS policy template SDWANPolicy4437632. Thus, a controller of the control plane may group tunnels based on common attributes and create corresponding instances of QoS policies to be installed on the tunnels of a group.

Thus, the techniques and architecture provide for reusing QoS policy instances for groups of SDWAN transport locators (TLOCs) sharing the same attributes. For example, the attributes may include subscriber transport bandwidth (e.g., a transport bandwidth based on a user profile), QoS policy template profile information, transport locator color, etc. All of this information may be shared across the SDWAN fabric and is generally available in the overlay management protocol (OMP) TLOC database. Most network subscribers, e.g., users, share similar branch profiles with the similar transport bandwidth capacity and subscription of QoS policy templates. The techniques and architecture thus save overall IOS processing time regarding recursive processing overhead for policy installation and avoids the flapping by the FTM control plane. With QoS policy instance reuse, a very high scale improvement may be achieved, improving convergence with high scale of tunnels. Additionally, group-based QoS policy and policy instance sharing for the same group of tunnels (spokes)/TLOCs/users (subscribers) at the data-plane, reduce the required number of QoS polices and queuing resources when tunnel scale increases.

Figure 4:
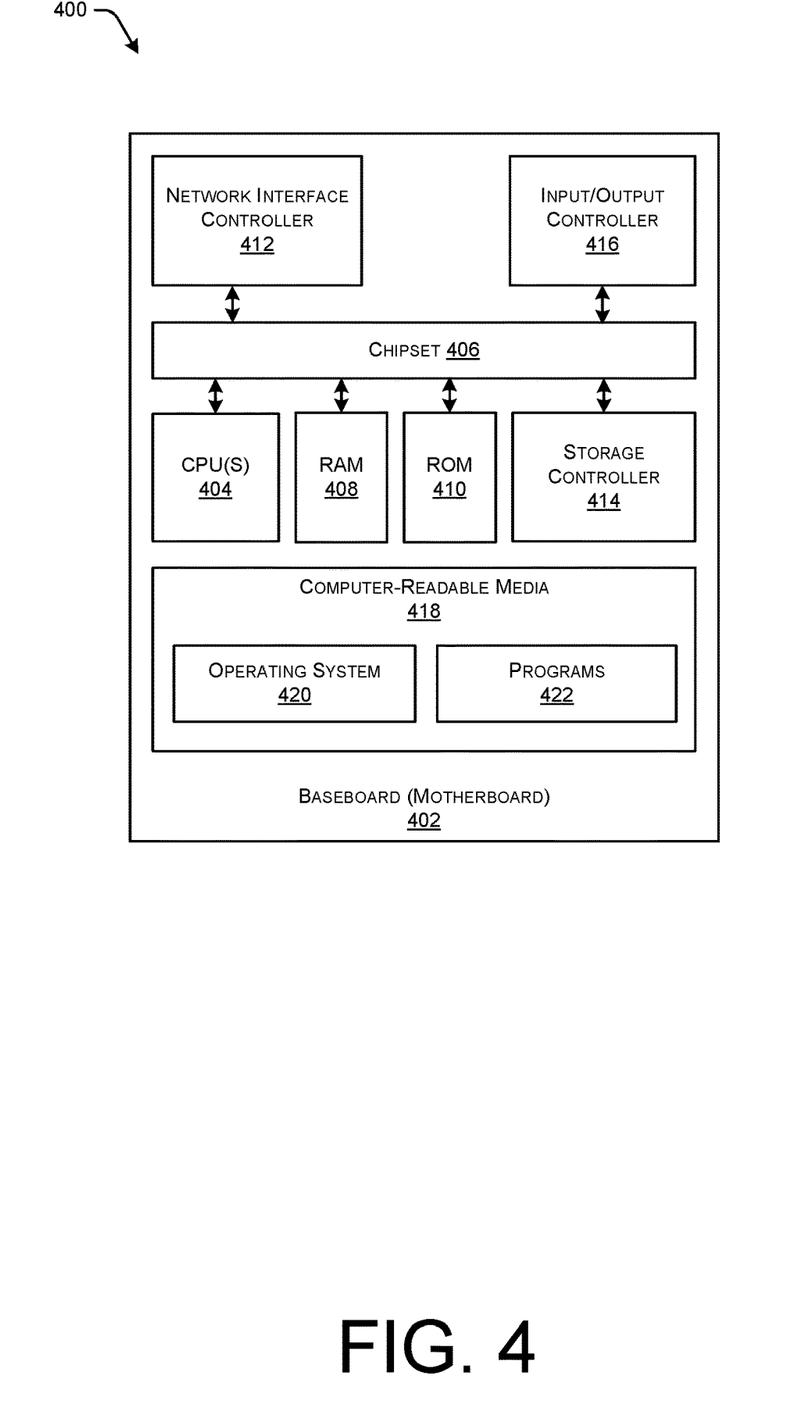
FIG. 4 is a computer architecture diagram showing an example computer hardware architecture for implementing a device that can be utilized to implement aspects of the various technologies presented herein.

FIG. 4 shows an example computer architecture for a computing device 400 capable of executing program components for implementing the functionality described above. In configurations, one or more of the computing devices 400 may be used to implement one or more of the components of FIGS. 1, 2A, 2B, and 3. The computer architecture shown in FIG. 4 illustrates a conventional server computer, router, switch, workstation, desktop computer, laptop, tablet, network appliance, e-reader, smartphone, or other computing device, and can be utilized to execute any of the software components presented herein. The computing device 400 may, in some examples, correspond to a physical device or resources described herein.

The computing device 400 includes a baseboard 402, or "motherboard," which is a printed circuit board to which a multitude of components or devices can be connected by way of a system bus or other electrical communication paths. In one illustrative configuration, one or more central processing units ("CPUs") 404 operate in conjunction with a chipset 406. The CPUs 404 can be standard programmable processors that perform arithmetic and logical operations necessary for the operation of the computing device 400.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 can provide an interface to a RAM 408, used as the main memory in the computing device 400. The chipset 406 can further provide an interface to a computer-readable storage medium such as a read-only memory ("ROM") 410 or non-volatile RAM ("NVRAM") for storing basic routines that help to startup the computing device 400 and to transfer information between the various components and devices. The ROM 410 or NVRAM can also store other software components necessary for the operation of the computing device 400 in accordance with the configurations described herein.

The computing device 400 can operate in a networked environment using logical connections to remote computing devices and computer systems through a network. The chipset 406 can include functionality for providing network connectivity through a NIC 412, such as a gigabit Ethernet adapter. In configurations, the NIC 412 can be a smart NIC (based on data processing units (DPUs)) that can be plugged into data center servers to provide networking capability. The NIC 412 is capable of connecting the computing device 400 to other computing devices over networks. It should be appreciated that multiple NICs 412 can be present in the computing device 400, connecting the computer to other types of networks and remote computer systems.

The computing device 400 can include a storage device 418 that provides non-volatile storage for the computer. The storage device 418 can store an operating system 420, programs 422, and data, which have been described in greater detail herein. The storage device 418 can be connected to the computing device 400 through a storage controller 414 connected to the chipset 406. The storage device 418 can consist of one or more physical storage units. The storage controller 414 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 400 can store data on the storage device 418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 418 is characterized as primary or secondary storage, and the like.

For example, the computing device 400 can store information to the storage device 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 400 can further read information from the storage device 418 by detecting the physical states or characteristics of one or more particular locations within the physical storage units.

In addition to the mass storage device 418 described above, the computing device 400 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 400. In some examples, the operations performed by the cloud network, and or any components included therein, may be supported by one or more devices similar to computing device 400. Stated otherwise, some or all of the operations described herein may be performed by one or more computing devices 400 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 418 can store an operating system 420 utilized to control the operation of the computing device 400. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 418 can store other system or application programs and data utilized by the computing device 400.

In one embodiment, the storage device 418 or other computer-readable storage media is encoded with computer-executable instructions which, when loaded into the computing device 400, transform the computer from a general-purpose computing system into a special-purpose computer capable of implementing the embodiments described herein. These computer-executable instructions transform the computing device 400 by specifying how the CPUs 404 transition between states, as described above. According to one embodiment, the computing device 400 has access to computer-readable storage media storing computer-executable instructions which, when executed by the computing device 400, perform the various processes described above with regard to FIGS. 1, 2A, 2B, and 3. The computing device 400 can also include computer-readable storage media having instructions stored thereupon for performing any of the other computer-implemented operations described herein.

The computing device 400 can also include one or more input/output controllers 416 for receiving and processing input from a number of input devices, such as a keyboard, a mouse, a touchpad, a touch screen, an electronic stylus, or other type of input device. Similarly, an input/output controller 416 can provide output to a display, such as a computer monitor, a flat-panel display, a digital projector, a printer, or other type of output device. It will be appreciated that the computing device 400 might not include all of the components shown in FIG. 4, can include other components that are not explicitly shown in FIG. 4, or might utilize an architecture completely different than that shown in FIG. 4.

The computing device 400 may support a virtualization layer, such as one or more virtual resources executing on the computing device 400. In some examples, the virtualization layer may be supported by a hypervisor that provides one or more virtual machines running on the computing device 400 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   evaluating a user profile of a user of a wide area network (WAN);
   based at least in part on the evaluating, determining tunnels within the WAN having one or more common attributes;
   based at least in part on the one or more common attributes, grouping the tunnels into groups; and
   for each particular group, installing, by a controller of a control plane of the WAN, a corresponding quality of service (QoS) policy instance on each tunnel of the particular group.

2. The method of claim 1, wherein the one or more common attributes comprises at least a QoS policy template.

3. The method of claim 1, wherein the one or more common attributes comprises at least a transport bandwidth based on the user profile.

4. The method of claim 1, wherein the one or more common attributes comprises at least a transport locator (TLOC) color.

5. The method of claim 1, wherein the one or more common attributes comprise two or more common attributes.

6. The method of claim 5, wherein the two or more common attributes comprises at least a QoS policy template.

7. The method of claim 5, wherein the two or more common attributes comprises at least a transport bandwidth based on the user profile.

8. The method of claim 5, wherein the two or more common attributes comprises at least a transport locator (TLOC) color.

9. The method of claim 1, further comprising:
   for each particular group, sharing, by the controller of the control plane of the WAN with a controller of a data plane of the WAN, the corresponding QoS policy instance for each tunnel of the particular group.

10. A system comprising:
    one or more processors; and
    one or more non-transitory computer-readable media storing computer-executable instructions that, when executed by the one or more processors, cause the one or more processors to perform actions comprising:
    evaluating a user profile of a user of a wide area network (WAN);
    based at least in part on the evaluating, determining tunnels within the WAN having one or more common attributes;
    based at least in part on the one or more common attributes, grouping the tunnels into groups; and
    for each particular group, installing, by a controller of a control plane of the WAN, a corresponding quality of service (QoS) policy instance on each tunnel of the particular group.

11. The system of claim 10, wherein the one or more common attributes comprises at least a QoS policy template.

12. The system of claim 10, wherein the one or more common attributes comprises at least a transport bandwidth based on the user profile.

13. The system of claim 10, wherein the one or more common attributes comprises at least a transport locator (TLOC) color.

14. The system of claim 10, wherein the one or more common attributes comprise two or more common attributes.

15. The system of claim 14, wherein the two or more common attributes comprises at least a QoS policy template.

16. The system of claim 14, wherein the two or more common attributes comprises at least a transport bandwidth based on the user profile.

17. The system of claim 14, wherein the two or more common attributes comprises at least a transport locator (TLOC) color.

18. The system of claim 10, further comprising:
    for each particular group, sharing, by the controller of the control plane of the WAN with a controller of a data plane of the WAN, the corresponding QoS policy instance for each tunnel of the particular group.

19. One or more non-transitory computer-readable media storing computer-executable instructions that, when executed by one or more processors, cause the one or more processors to perform actions comprising:
    evaluating a user profile of a user of a wide area network (WAN);
    based at least in part on the evaluating, determining tunnels within the WAN having one or more common attributes;
    based at least in part on the one or more common attributes, grouping the tunnels into groups; and
    for each particular group, installing, by a controller of a control plane of the WAN, a corresponding quality of service (QoS) policy instance on each tunnel of the particular group.

20. The one or more non-transitory computer-readable media of claim 19, wherein the one or more common attributes comprise two or more common attributes.

* * * * *